Nov. 25, 1952  C. A. GUYNN  2,619,343
TANK BEVELING APPARATUS
Filed Dec. 14, 1949  3 Sheets-Sheet 1

INVENTOR
CHARLES A. GUYNN
BY Jennings & Carter
ATTORNEYS

Nov. 25, 1952  C. A. GUYNN  2,619,343

TANK BEVELING APPARATUS

Filed Dec. 14, 1949  3 Sheets-Sheet 2

INVENTOR
CHARLES A. GUYNN

BY  Jennings & Carter

ATTORNEYS

Nov. 25, 1952     C. A. GUYNN     2,619,343
TANK BEVELING APPARATUS
Filed Dec. 14, 1949     3 Sheets-Sheet 3
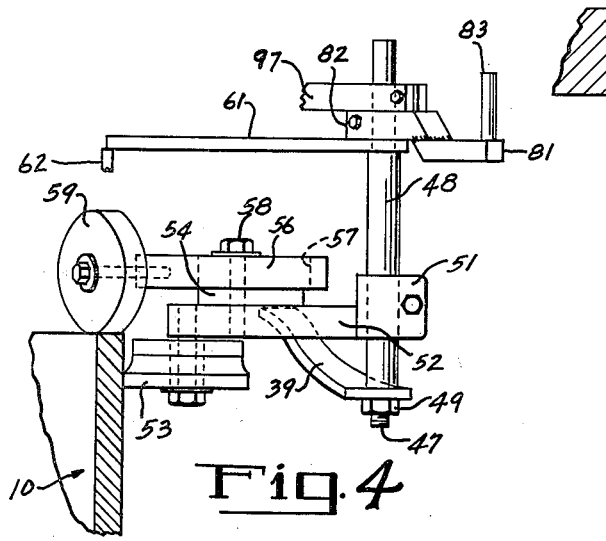
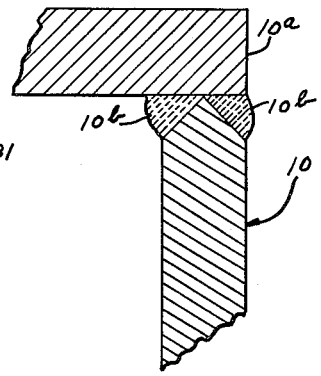
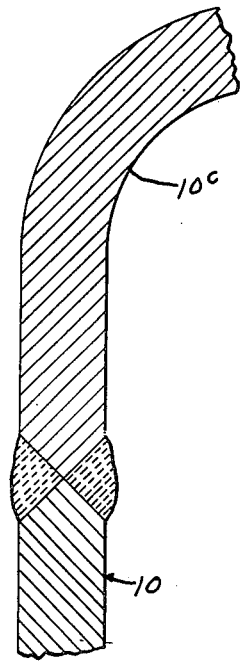
INVENTOR
CHARLES A. GUYNN
BY Jennings & Carter
ATTORNEYS Patented Nov. 25, 1952

2,619,343

UNITED STATES PATENT OFFICE 2,619,343

TANK BEVELING APPARATUS

Charles A. Guynn, Pascagoula, Miss., assignor to The Ingalls Shipbuilding Corporation, a corporation of Delaware Application December 14, 1949, Serial No. 132,937

7 Claims. (Cl. 266—23)

My present invention relates to apparatus for beveling the ends of cylindrical tanks, heads for tanks and the like, to provide beveled edges preparatory to welding the same together.

An object of my invention is to provide beveling apparatus of the character designated which comprises means to attach a supporting spider for a pair of angularly disposed cutting torches to a tank shell or dished head for a tank, whereby the torches are accurately directed against the edge of the tank shell or head as the case may be, thus cutting double bevels on the periphery of the shell or head at one pass of the torches.

A further object is to provide apparatus of the character designated which may be quickly and easily attached to a tank shell or tank head, and in which accurate centering of the supporting spider with the shell or head is made unnecessary through the provision of spring biased torch holding and drive mechanism carried on the outer end of a rotating arm.

A further object is to provide apparatus of the character designated which shall be simple of construction and operation, and in which the torches when supported on the tank shell or head may be universally adjusted with respect to the edge to be beveled thus permitting the formation of beveled edges with a minimum of time and expense.

Apparatus illustrating the features of my invention is shown in the accompanying drawings forming a part of this application in which:

Fig. 4 is a detail sectional view taken generally along line IV—IV of Fig. 2;

Fig. 8 is a fragmental sectional view through a tank shell and head showing the same welded together; and, Fig. 9 is a fragmental sectional view through a tank shell and dished head showing the double bevel on the welded edges thereof.

Figure 1:
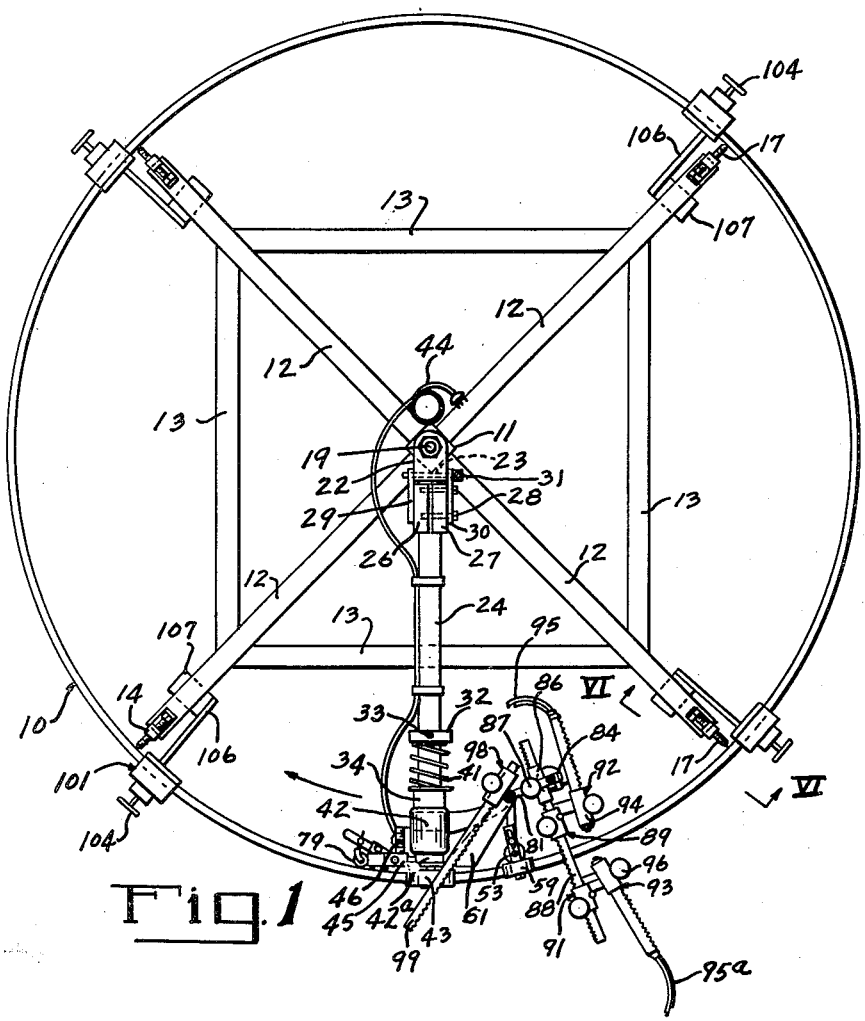
Fig. 1 is a plan view of a tank showing my improved apparatus in the process of being placed thereon, certain of the parts being broken away for the sake of clarity.

Referring now to the drawings for a better understanding of my invention and more particularly to Fig. 1, my improved apparatus is shown in the process of being mounted on the end of a cylindrical tank shell 10. In using my apparatus the tank is placed in upright position. As will hereinafter appear, my invention is equally applicable to beveling the head of a dished head for tanks or other cylindrical bodies as well as the shell itself.

As shown in Fig. 1, my improved apparatus comprises a spider made up of a central block 11 and having four arms 12 welded thereto. Each of the arms 12 is identical, and hence a description of one will suffice for all. The arms are braced by members 13 and are equi-angularly spaced. On the outer ends of each of the arms 12 is an upstanding lug 14. In each lug is a horizontally disposed threaded hole 16 adapted to threadably receive a set screw 17. Each of the set screws 17 is disposed to be run in through the threaded opening in the lug thereby to engage the inner walls of the shell or head, thus to support the entire spider.

Figure 3:
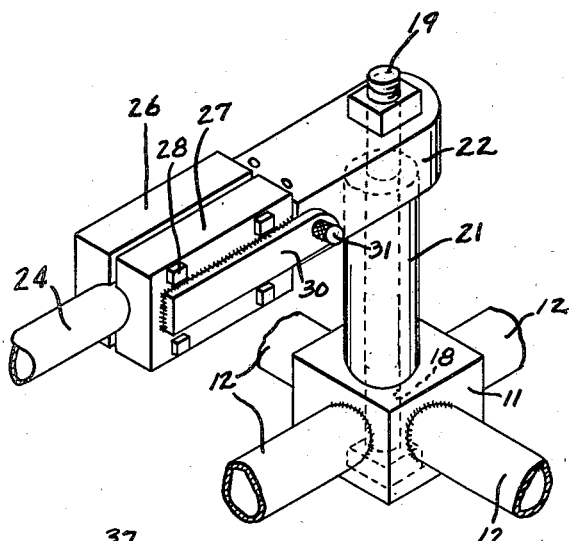
Fig. 3 is a perspective view partly in section and broken away of the central portion of the spider.

As shown more clearly in Fig. 3 the block 11 is provided with a vertically disposed opening 18 through which passes a bolt 19. On top of the block 11 and surrounding the bolt 19 is a spacer 21.

Disposed to be supported at its inner end for rotation about the bolt 19 as a pivot point and to be supported on the end of the tank shell is my improved rotary beveling mechanism. This mechanism comprises generally a block 22 having a vertically disposed hole in one end fitting over the upper end of the bolt 19, on top of the spacer 21. In the opposite end of the block 22 is a horizontally disposed hole 23. Extending outwardly of the block 22 is a radially disposed traveling arm 24 having on its inner end a pair of split blocks 26 and 27 which are clamped about the inner end of the arm by means of bolts 28. Welded to the sides of the blocks 26 and 27 are inwardly extending straps 29 and 30. The straps 29 and 30 overhang the inner ends of the blocks 26 and 27 and are adapted to be secured to the block 22 by means of a pin 31 passing through suitable holes in the end of the straps and the hole 23 in the outer end of the block 22.

Figure 2:
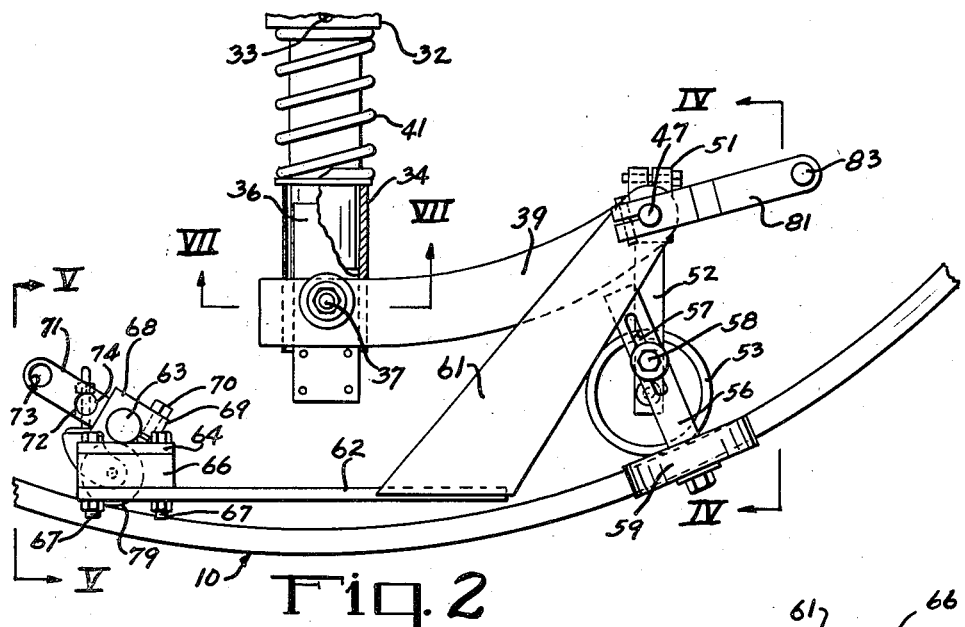
Fig. 2 is an enlarged plan view of the outer end of the torch supporting arm, the torches and certain other portions of the mechanism being omitted for the sake of clarity.
Figure 5:
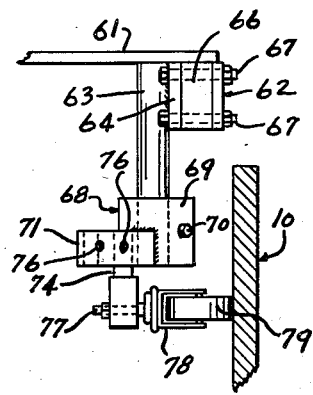
Fig. 5 is a detail sectional view taken generally along line V—V of Fig. 2.
Figure 7:
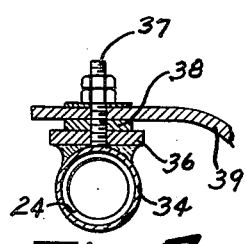
Fig. 7 is a detail sectional view taken along line VII—VII of Fig. 2.

Near the outer end of the traveling arm 24 is a stop member in the form of a collar 32 secured to the arm by means of a set screw 33. On the outer end of the arm 24 is slidably mounted a sleeve 34. As best shown in Figs. 2 and 7, welded to the top of the sleeve 34 is a plate 36. Extending upwardly from the center of the plate is a stud 37. On top of the plate 36 is a spacing washer 38, and on top of the washer 38 is a beveling torch and guide roller supporting arm 39. The sleeve 34 and the remainder of the mechanism carried thereby including the arm 39, is spring biased outwardly of the arm 24 by means of a compression spring 41 having one end contacting the collar 32 and the opposite end contacting the inner end of the sleeve 34.

The end of the plate 36 outwardly of the arm 24 overhangs the sleeve 34. Mounted on the overhanging end of the plate 36 is a driving motor 42 which may be of the variable speed type and which may have its shaft connected to a speed reduction gear box 42a. Mounted on the output shaft of the gear box is a friction driving roller 43 disposed to contact the end of the shell 10, thus to rotate the arm 24 together with the mechanism attached thereto. Electricity is supplied to the motor 42 through a cable 44 under control of a switch 45, and the speed of the motor may be varied by means of a rheostat 46, indicated diagrammatically in Fig. 1.

The actual beveling, guide and supporting roller mechanism will now be described. As best shown in Figs. 1, 2, 4 and 7, on the outer end of the arm 39 I provide a vertically disposed rod 47. The rod 47 has an enlarged section 48 above the arm 39 and a reduced diameter upper end. The lower end of the rod is secured to the arm 39 by means of a nut 49. Secured to the enlarged portion 48 of the pin 47 is the clamp end 51 of an outwardly extending arm 52. Rotatably mounted in the end of the arm 52, in position to bear against the inner wall of the shell 10, is a roller 53.

On top of the arm 52 is a spacing lug 54. Resting on top of the lug 54 is an arm 56 having a slot 57 therein. Passing through the slot and threaded into the arm 52 is a stud 58. Mounted in the end of the arm 56 is a roller 59 disposed to ride on top of the edge of the tank 10. The roller 59 preferably is made of resilient material such as medium hard rubber while the roller 53 is preferably made of non-resilient material such as metal.

Mounted non-rotatably on the pin 47, on the reduced upper end thereof, is an outwardly extending arm 61. Depending from the arm 61 and secured thereto is another arm 62. On the end of the arm 62 is a mechanism for adjustably supporting a second roller disposed to bear against the inner wall of the shell. This mechanism comprises a vertical pin 63 having a plate 64 welded to its side near the upper end thereof. Next adjacent the plate 64 is a spacer block 66. Passing through the plate 64, spacer block 66 and the end of the arm 62 are bolts 67 disposed to secure the pin to the end of the arm 62. On the lower end of the pin 63 is adjustably mounted a block 68 having a clamp end 69 secured about the end of the pin by means of a screw 70. Outstanding from the block 68 is a supporting lug 71 having a pair of holes 72 and 73 therein. Adapted to be mounted selectively in the holes 72 and 73 is a pin 74. Set screws 76 are adapted to be run in against the pin 74 to hold the same non-rotatably with respect to the lug 71.

The lower end of the pin 74 is provided with a horizontally disposed opening adapted to receive a rounded shank 77 projecting from a caster frame 78. Mounted in the caster frame 78 is a rubber tired roller 79 disposed to bear against the inner wall of the shell 10.

Above the arm 61 is mounted an arm 81 having a clamp end 82 fitting about the reduced upper end of the pin 47. Secured to the arm 81 is a pin 83. Fitting about the pin 83 is the clamp end 84 of a slide holder 86 carrying therein an adjusting screw 87 having a pinion, not shown, on its lower end. Fitting within the slide 86 is a rack bar 88 with the teeth thereof engaged with the pinion on the end of the screw 87.

Mounted on the rack bar 88 are a pair of slides, adjusting screw and pinion members, similar to the members just mentioned and indicated generally by the numerals 89 and 91. Secured to each of the last named slides is a burning torch assembly indicated generally by the numerals 92 and 93. In the manner understood for such devices, the torches proper may be provided with rack teeth, and each of the same may be supported in slide, adjusting screw and pinion devices 94 and 96. The torches are directed upwardly whereby, in the manner to be explained the end of the tank shell 10 is beveled. Oxygen and acetylene may be supplied to the torches through hose 95 and 95a.

Also mounted on the reduced upper end of the pin 47, and extending oppositely to the arm 81 is another arm 97. The arm 97 carries a slide, adjusting screw and pinion devices, indicated at 98, similar to the devices 86, 91, 94 and 96. Fitting within the slide mechanism 98 is a counterweighting rack bar 99 which, in the manner understood is disposed to counterbalance the weight of the torches, maintaining the same in proper alignment.

Figure 6:
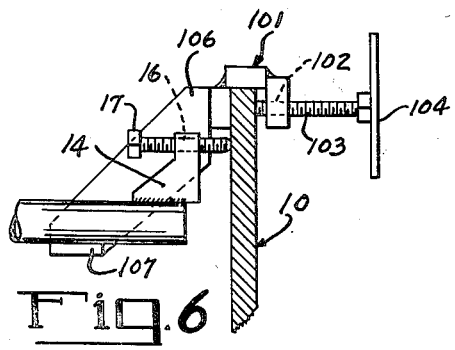
Fig. 6 is a view of one of the removable brackets taken generally along line VI—VI of Fig. 1.

Referring particularly to Figs. 1 and 6, I show removable members which are disposed to be used in placing my improved apparatus on a tank shell or tank head. These devices are in the form of removable hanger brackets for placing the central spider substantially at the center of the shell or tank head and to support the spider until the set screws are run in. Each hanger bracket comprises an inverted U-shaped clamp portion 101 adapted to straddle the edge of the shell 10. One leg of the U-shaped member is provided with a threaded opening 102 for receiving a clamping screw 103 having an operating wheel 104 on its end. Extending inwardly and downwardly of the tank and secured to the U-shaped clamp portion 101 is a plate 106. The plate is provided with a horizontal foot section 107 adapted to temporarily support the ends of the arm 12 of the spider when mounting the spider on the tank or shell as will be explained.

From the foregoing the method of constructing and using my improved apparatus may now be explained and understood. In placing the device on a tank shell or dished head the four removable hanger brackets are placed approximately at 90° to each other and secured in place by running in on the hand wheel 104, thus securely clamping the members to the top of the shell. The set screws 17 in the ends of the arms 12 are run inwardly, and the spider is laid in place with the outer ends of the arms 12 resting on the foot 107 of the hanger brackets. The set screws 17 are run outwardly, engaging the inner walls of the tank shell. The hanger brackets are now removed, thus leaving the spider and entire mechanism embodying the four arms, the cross bracing 13 and the vertically disposed pin 19, spacer 21 and block 22 in place on the tank. With the spider mounted as described the center of the spider coincides with the center of the tank I now bring into place the traveling arm 24 together with its associated mechanism, including the motor, its driving roller, and the other side and end rollers together with the torches. By placing the thrust rollers 53 and 79 against the inside of the tank wall I compress the spring 41 by pushing radially outwardly on the arm 24, bringing the holes through the straps 29 and 30 into alignment with the cross hole 23 in the block 22. I now insert the pin 31, securing these members together. It will be apparent that the spring 41 thus presses the sleeve 34, together with the remainder of the mechanism carried thereby, outwardly. This brings the thrust rollers 53 and 79 into firm contact with the inside of the tank shell, positions the rollers 59 and 43 to support the end of the arm 24 and the beveling torches and associated mechanism. The cutting torches are fired, and the motor 42 is energized through the rheostat 46, thereby to determine the speed of rotation of the driving roller 43, the apparatus travelling as indicated by the arrows.

The double bevel of the tank shell 10 cut by my improved apparatus is indicated in Fig. 8. The head 10a of the tank shown in Fig. 8 may be of the flat type, and the welding material for filling, indicated at 10b, may thus be applied to both sides. Alternately, the head of the tank may be of the dished type 10c indicated in Fig. 9 and my improved apparatus may be employed to cut a beveled edge on such a head and the same then welded to the tank 10.

It will be noted that my invention is characterized by the provision of means to obtain accurate and positive adjustment of the angle of the torches and to hold these adjustments throughout the pass of the torches around the circular end of the tank or head. It will also be apparent that spring mounting the entire motor and torch assembly on the end of the arm 24 makes it unnecessary to accurately position the pin 19 at the center of the tank or head. My invention may thus be applied to a tank with very little accuracy on the part of the operator, and the removable hanger brackets indicated in Fig. 6 materially aid and simplify the installation and removal of the apparatus from a tank shell or head. When it is desired to remove the apparatus the brackets shown in Fig. 6 may be put in place, the set screws 17 loosened and the entire mechanism removed by means of a mechanical lifting device or by hand. In actual practice I have found that my improved apparatus is satisfactory in every way and that the same is effective to make either single or double beveled cuts on the end of cylindrical bodies.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. The combination with apparatus for beveling the end of a cylindrical tank shell and the like embodying a supporting spider the center of which coincides with the center of the shell when mounted thereon and means removably securing the spider to the inner walls of the shell, of a radially extending arm having its inner end pivoted to the center of the spider, a slidable sleeve on the outer end of the arm disposed for longitudinal movement along said arm, cutting torches and arm rotating mechanism carried by and rigidly connected to the sleeve, a roller mounted for rotation in a plane adjacent the end of the sleeve and adapted to engage the inner wall of the shell, and a spring carried by said arm biasing the sleeve outwardly of the radially extending arm on which the same is mounted.

2. Apparatus as defined in claim 1 in which the arm carries an electric motor mounted on the sleeve and a friction roller driven thereby adapted to contact the end of the shell.

3. In apparatus for beveling the end of a cylindrical tank shell and the like, a multi-arm spider, a set screw in the end of each arm adapted to contact the inner wall of the shell to removably secure the spider to the shell, a traveling arm pivotally mounted at one end to the radial center of the spider, a sleeve slidably surrounding the other end of the traveling arm and disposed to move longitudinally thereof, a stop member fixed to the traveling arm inwardly of the sleeve, a compression spring having one end bearing against the stop member and the other end bearing against the inner end of the sleeve, an electric motor mounted on the sleeve, a friction drive roller mounted for rotation on said arm outwardly of the motor and adapted to rest on the end of the shell wall, a pair of thrust rollers rotatably connected to the sleeve and adapted to engage the inner wall of the shell, a supporting roller connected to the sleeve and adapted to rest on the end of the shell wall, and a pair of cutting torches supported by the sleeve and adapted to cut a double bevel on the end of the shell wall as the traveling arm rotates about the shell.

4. In apparatus for beveling the end of a cylindrical tank shell and the like, a multi-arm spider having a central member to which the inner ends of the arms are secured, an upstanding pin carried by the central member, a traveling arm pivotally mounted at its inner end to the pin, a sleeve slidably surrounding the outer end of the arm and disposed to move longitudinally thereof, a spring biasing the sleeve outwardly of the arm, a pair of thrust rollers carried by the sleeve adapted to engage the inner wall of the shell, a supporting roller carried by the sleeve adapted to engage the end of the shell wall, a pair of beveling devices mounted on and movable with the sleeve and adapted to engage the end of the shell, and a motor driven roller mounted on said sleeve and adapted to frictionally engage the end of the shell and move the traveling arm and beveling devices about the shell.

5. Apparatus as defined in claim 4 in which one of said thrust rollers is disposed substantially beneath the supporting roller.

6. Apparatus as defined in claim 4 in which one of the thrust rollers is disposed substantially beneath the supporting roller and is made of non-resilient material, and in which the other thrust roller is made of resilient material.

7. Apparatus as defined in claim 4 in which the thrust rollers are disposed one ahead of the other with respect to direction of rotation of said traveling arm, the forwardmost roller being mounted for pivotal movement relative to the sleeve and the rearmost roller being fixedly mounted relative to the sleeve against other than rotational movement.

CHARLES A. GUYNN.

REFERENCES CITED

The following references are of record in the file of this patent:

UNITED STATES PATENTS

| Number | Name | Date |
|---|---|---|
| 1,000,399 | Gessert | Aug. 15, 1911 |
| 1,124,784 | Monro | Jan. 12, 1915 |
| 1,172,933 | Bucknam | Feb. 22, 1916 |
| 1,345,242 | Reynolds | June 29, 1920 |
| 1,499,498 | Bienenstock | July 1, 1924 |
| 1,692,924 | Brown | Nov. 27, 1928 |
| 1,775,667 | Bucknam | Sept. 16, 1930 |
| 1,852,413 | Hickey | Apr. 5, 1932 |
| 2,061,442 | Summers | Nov. 17, 1936 |